United States Patent

Sham

[11] Patent Number: 5,771,784
[45] Date of Patent: Jun. 30, 1998

[54] PADDLE FOR BREAD-MAKING MACHINE

[75] Inventor: John C. K. Sham, Hong Kong, Hong Kong

[73] Assignee: Pentalpha Enterprises Ltd., Aberdeen, Hong Kong

[21] Appl. No.: 901,176

[22] Filed: Jul. 28, 1997

[51] Int. Cl.$^6$ .............................. A21D 2/00; A21D 8/00; A47J 27/00; A47J 37/00
[52] U.S. Cl. ................................ 99/348; 99/468; 366/98; 366/146; 366/314
[58] Field of Search ............................. 99/348, 468, 467, 99/326–333, 352, 353, 483; 366/144–146, 149, 96–98, 69, 205, 314, 343, 601

[56] References Cited

U.S. PATENT DOCUMENTS

| | | | |
|---|---|---|---|
| 4,903,587 | 2/1990 | Nagasaka et al. | 99/325 |
| 4,903,588 | 2/1990 | Horiuchi et al. | 99/348 |
| 4,903,589 | 2/1990 | Aoyama | 99/348 |
| 4,977,822 | 12/1990 | Seo et al. | 366/98 X |
| 5,392,695 | 2/1995 | Junkel | 99/328 |
| 5,410,949 | 5/1995 | Yung | 99/348 |
| 5,433,139 | 7/1995 | Kitagawa et al. | 99/327 |
| 5,435,235 | 7/1995 | Yoshida | 99/327 |
| 5,445,061 | 8/1995 | Barradas | 366/146 X |
| 5,463,937 | 11/1995 | Belongia et al. | 99/348 |
| 5,477,776 | 12/1995 | Shimokubo et al. | 99/468 X |
| 5,493,955 | 2/1996 | Belongia et al. | 99/352 X |
| 5,528,979 | 6/1996 | Yoshida | 99/327 |

*Primary Examiner*—Timothy F. Simone
*Attorney, Agent, or Firm*—Salzman & Levy

[57] ABSTRACT

The present invention features a bread-making machine that has a kneading paddle which remains in the bucket after the baking cycle. The bread-making machine automatically entraps, or vertically constrains, the kneading paddle to the rotating drive shaft. Upon the initial rotation of the drive shaft, the paddle shifts backwardly with respect to the drive shaft under a reactive, inertial force. The paddle will rotate approximately twenty-five degrees in a counterclockwise direction with respect to the shaft. This is made possible by the looseness of the fit of the drive shaft within the paddle's bore. A lip positioned on the top of the drive shaft will engage the top surface of the paddle hub, when the paddle is caused to shift. This engagement will capture the paddle, causing it to become vertically constrained to the drive shaft. Upon completion of the baking cycle, the baked bread can be removed without the paddle, which remains affixed to the drive shaft. The paddle hub has a bore that has an approximately rectangular, cross-sectional shape. The bore receives the substantially rectangular drive shaft. The paddle is initially deposited over the drive shaft, and the dough is placed in the bucket. The paddle is automatically, vertically locked into place, when the kneading cycle is commenced.

3 Claims, 2 Drawing Sheets

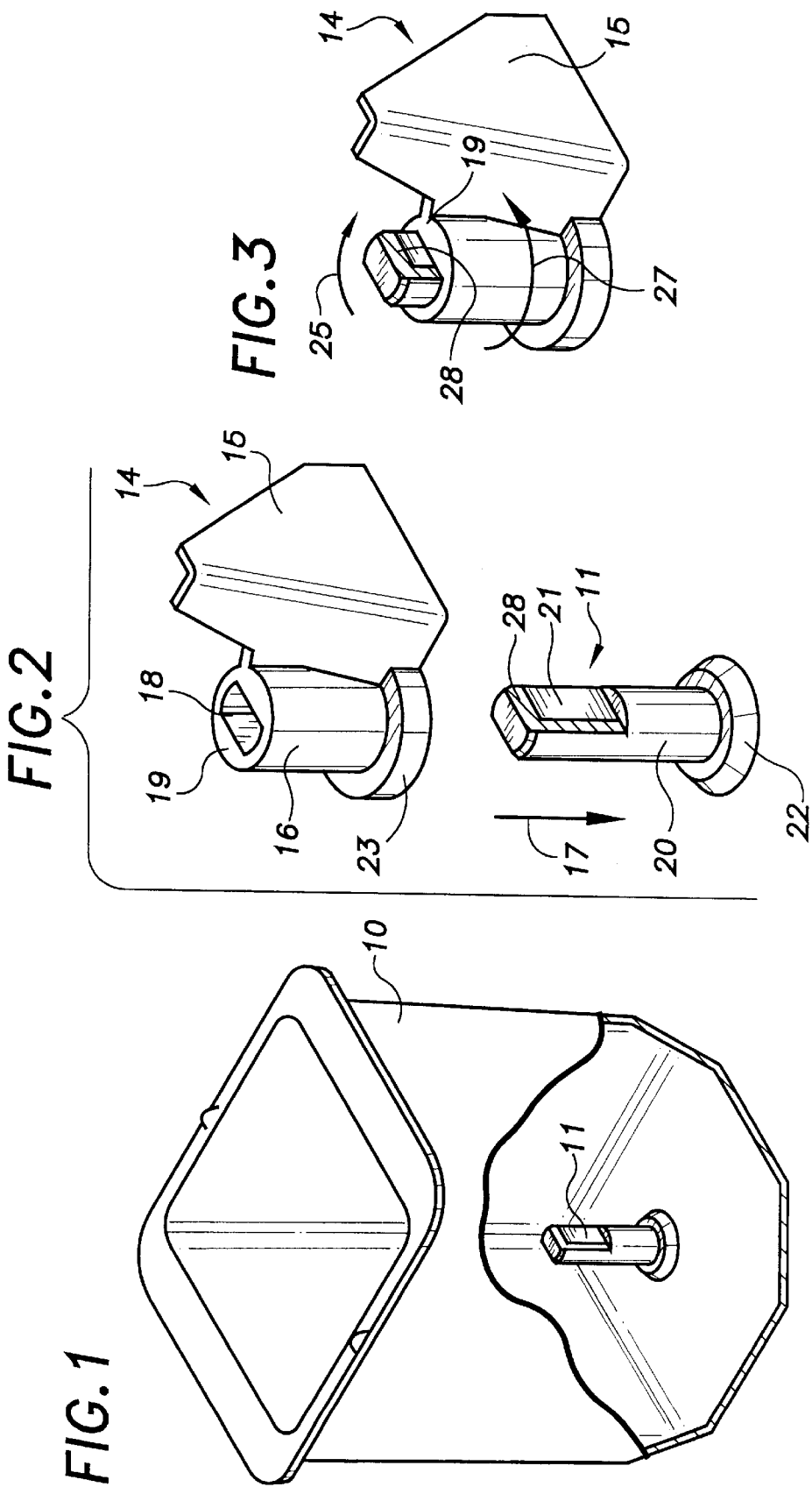

PADDLE FOR BREAD-MAKING MACHINE

FIELD OF THE INVENTION

The present invention pertains to making bread and, more particularly, to a bread-making apparatus having a paddle that remains in the dough-kneading and bread-baking bucket when the baking cycle is completed and the bread removed therefrom.

BACKGROUND OF THE INVENTION

Recently, bread-making machines have become a quite popular and useful appliance in the home. These machines make fine homemade bread that is fresh, hot and flavorful. Using the bread-making machine is generally simple and convenient. People also enjoy the ability to add particular ingredients to the dough that enhances the flavor of the bread.

Most bread-making machines used in the home comprise a dough-kneading bucket that has an electromechanically-driven kneading impeller, or, paddle. In the vast majority of these bread-making machines, the kneaded dough is often embedded in the paddle, when the kneaded and baked dough is removed from the bucket, which necessitates the removal of the kneading paddle from the dough. This need to remove the paddle from the bread is an inconvenience that should be avoidable.

The present invention provides a more convenient bread-making apparatus that is free of the need for the user to remove the kneading paddle from the baked bread at the end of the baking cycle. The current invention features a bread-kneading apparatus that retains the paddle within the bucket, of the machine after the baking cycle is completed.

This invention automatically retains the paddle within the bucket, without the need for expensive components such as locking detents or snap-acting bayonets. The paddle is designed with an internal, cross-sectional, rectangular-shaped bore. The rotating shaft that drives the paddle is also rectangular in cross-section, and loosely fits within this bore. The looseness of the fit allows the paddle to shift within the bore under reactive inertia, upon actuation of the drive shaft. The drive shaft has a lip that automatically secures the paddle to the shaft, as the paddle is caused to shift. The paddle rotates approximately twenty-five degrees under the aforesaid reactive, inertial force, causing the lip of the shaft to ride over the top surface of the paddle hub. This vertically captures the paddle hub upon the drive shaft. Once locked into place, the paddle will remain affixed to the shaft until the bucket and paddle are removed for cleaning.

It is an object of the present invention to provide an improved bread-making machine.

It is another object of this invention to provide a bread-making machine with a kneading blade that becomes automatically, vertically constrained upon the drive shaft disposed in the machine's kneading bowl.

It is a further object of the invention to provide a bread-making machine with a kneading blade that becomes vertically captured upon the drive shaft disposed in the machine's kneading bowl, without there being the need to resort to expensive components, such as lock detents or snap-action bayonets.

DISCUSSION OF RELATED ART

In U.S. Pat. No. 5,477,776 (issued to SHIMOKUBO et al on Dec. 26, 1995, and entitled "Shaft Supporting Mechanism for Mixing and Kneading Device"), a shaft support for a kneading impeller of a bread-making machine is illustrated.

The kneading blade or impeller is deposited upon the drive shaft, which has a D-shaped cut therein. An abutment surface of the blade meshes with the D-shaped surface of the shaft, so that the blade is capable of being rotatively driven thereby. This blade-and-shaft construction teaches away from the present invention, in that the blade of SHIMOKUBO et al does not become vertically constrained to the shaft upon the rotation thereof, i.e., it remains removable with the baked bread.

SUMMARY OF THE INVENTION

In accordance with the present invention, there is provided a bread-making machine having a kneading paddle that remains in the bucket after the baking cycle. The bread-making machine automatically entraps, or vertically constrains, the kneading paddle to the rotating drive shaft. Upon the initial rotation of the drive shaft, the paddle shifts backwardly with respect thereto, under a reactive, inertial force. The paddle will rotate approximately twenty-five degrees in a counterclockwise direction with respect to the shaft. This is made possible by the looseness of the fit of the drive shaft within the paddle's bore. A lip disposed on the top of the drive shaft will engage the top surface of the paddle hub, when the paddle is caused to shift. This engagement will capture the paddle, causing it to become vertically constrained to the drive shaft. Upon completion of the baking cycle, the baked bread can be removed without the paddle, which remains affixed to the drive shaft. The paddle hub comprises a bore having an approximately rectangular, cross-sectional shape. The bore receives the substantially rectangular drive shaft. The paddle is initially deposited over the drive shaft, and the dough is placed in the bucket. The paddle is automatically, vertically locked into place, when the kneading cycle is commenced.

BRIEF DESCRIPTION OF THE DRAWINGS

A complete understanding of the present invention may be obtained by reference to the accompanying drawings, when considered in conjunction with the subsequent, detailed description, in which:

FIG. 1 illustrates a perspective, cutaway view of the bucket of the bread-making machine of this invention;

FIG. 2 depicts an enlarged view of the drive shaft and kneading impeller-blade that fits within the bucket, shown in FIG. 1, wherein the shaft and the blade are illustrated in an unassembled state;

FIG. 3 illustrates an enlarged view of the drive shaft and kneading impeller-blade that fits within the bucket, shown in FIG. 1, wherein the shaft and the blade are depicted in an assembled state;

DESCRIPTION OF THE PREFERRED EMBODIMENT

Generally speaking, the invention features a bread-making apparatus in which, after the baking cycle, a kneading paddle remains temporarily affixed to a rotating drive shaft. This allows a user to make bread and remove it from the bucket of the machine, without having to remove the blade of the paddle therefrom. In other words, when the bread is removed from the bucket, the kneading paddle remains affixed to the bucket's drive shaft.

Now referring to FIG. 1, a bucket 10 of a bread-making machine is shown in a perspective, cutaway view. A drive shaft 11 for rotating the dough kneading-impeller, or, kneading paddle 14 depicted in FIG. 2, is disposed at the bottom center of the bucket 10.

Figure 5:
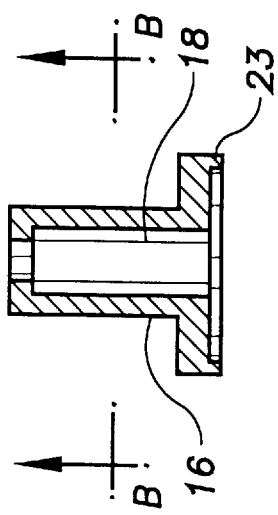
FIG. 5 depicts a sectional view of the kneading impeller-blade of FIG. 4, taken along lines A—A thereof.
Figure 6:
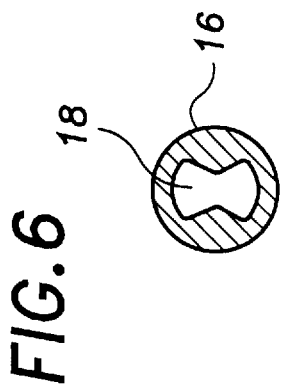
FIG. 6 illustrates a sectional view of the kneading impeller-blade of FIG. 5, taken along lines B—B thereof.

Referring to FIG. 2, an enlarged view of the drive shaft 11 is shown, with the kneading impeller or kneading paddle 14 disposed over the shaft 11, in a pre-assembly mode. The kneading paddle 14 comprises a blade portion 15, and a hollow-center, hub portion 16 that fits over the drive shaft 11, as shown by arrow 17. The bore 18 of the hollow-center, hub portion 16 of the kneading paddle 14 has a generally rectangularly-shaped hole 18. The top face 19 of the hollow-center, hub portion 16 can also be observed with reference to FIG. 4. Internally, the bore 18 of the hollow-center, hub portion 16 is shaped in an approximately rectangular cross-section, as best observed with reference to FIGS. 4–6.

The drive shaft 11 is shown as having a generally circular, cross-sectioned base 20 that supports a generally rectangular-shaped, upper portion 21. The base 23 of the paddle 14 is caused to rest upon the base 22 of the drive shaft 11, when assembled thereto (arrow 17). When assembled, the paddle 14 and the shaft 11 are caused to rotate as a single unit by a drive motor (not shown). During the kneading cycle, bread dough (not shown) is placed in the bucket 10. Upon actuation of the bread-making machine, the shaft-and-paddle combination is caused to rotate as aforementioned, thus kneading the dough.

Referring to FIG. 3, the paddle 14 is shown assembled to drive shaft 11. Upon initiation of the drive motor in a rotative, clockwise direction (arrow 25), the paddle 14 is caused to experience a reactive, inertial, counterclockwise force, as shown by the arrow 27. This inertial force is, in part, due to the load imparted to the blade 15 by the dough that is going to be kneaded in the bucket 10. The paddle 14 will shift approximately 25 degrees with respect to shaft 11. This shifting of the paddle 14 about the drive shaft 11 is made possible by the internally loose fit of the shaft 11 within the bore 18 of the hollow-center, hub portion 16.

Figure 4:
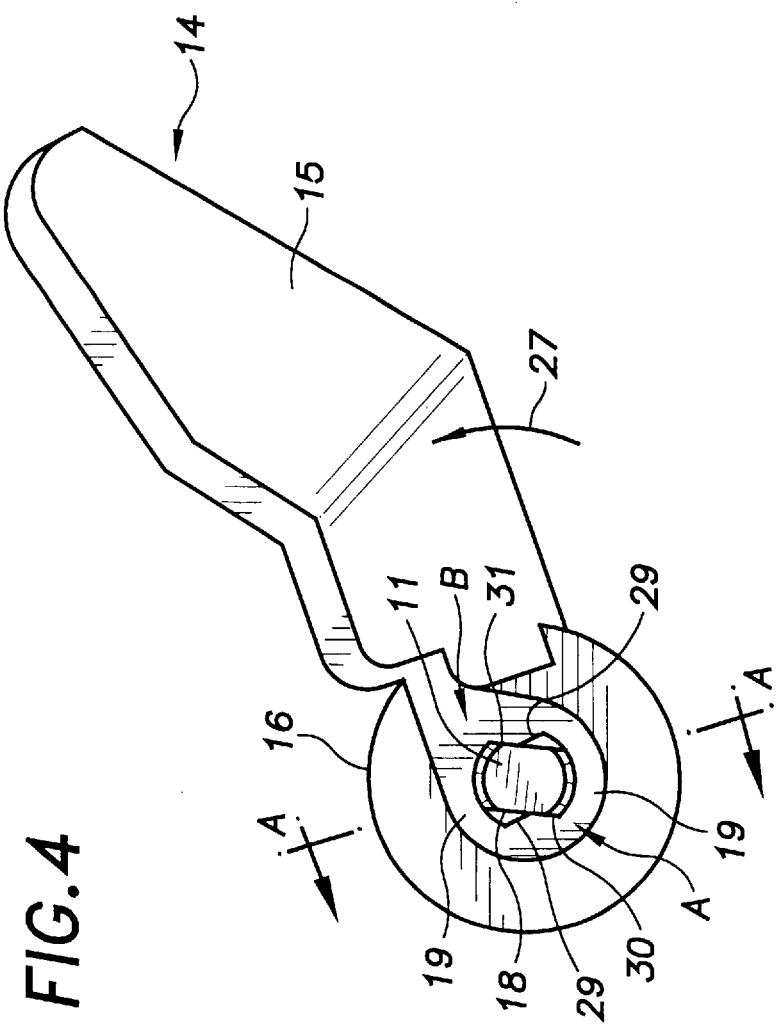
FIG. 4 shows an enlarged, top view of the kneading impeller-blade of FIG. 2 in a locked position.

Referring again to FIGS. 2 and 3, the rotative drive shaft 11 is shown to have a lip or an abutment section 28. When the shaft 11 is initially actuated, and the blade 15 experiences the reactive force 27, the lip 28 is caused to rotate over the top face 19 of the hollow-center, hub portion 16 of the paddle 14. The result is that the abutting edges 30 and 31, respectively, of the lip 28 will ride over the rectangular edges 29 of the bore 18, and engage the top face 19 at points A and B, respectively, as illustrated in FIG. 4.

The top face 19 will mutually engage with the respective, abutting edges 30 and 31; these abutting surfaces will, therefore, interlock with each other, which causes the paddle 14 to become vertically affixed to the drive shaft 11. Thus, when the bread is lifted from the bucket 10 after the baking cycle, the paddle 14 will remain in the bucket 10, and not leave with the baked bread.

Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Having thus described the invention, what is desired to be protected by Letters Patent is presented in the subsequently appended claims.

What is claimed is:

1. A kneading mechanism for making bread, comprising:
   a bucket for receiving bread dough to be kneaded and baked;
   a rotative drive-shaft disposed in said bucket for rotating a kneading paddle in order to knead said bread dough, said rotative drive-shaft having a generally rectangular, cross-sectional shape and a lip portion that is disposed on a top section of said rotative drive-shaft; and
   a kneading paddle having a kneading blade extending from a central, hollow, hub portion, said central, hollow, hub portion having a bore disposed therein for attaching said kneading paddle to said rotative drive-shaft and a top face portion, said bore comprising a generally rectangularly-shaped, cross-sectional hole, said bore loosely fitting about said drive shaft, so that when said rotative drive-shaft is initially actuated, said kneading paddle will be caused to shift with respect to said drive-shaft, and said generally rectangular, rotative drive-shaft will shift approximately 25° with respect to said rectangularly-shaped hole, thereby causing said lip portion of said shaft to ride over said top face portion of said paddle, and become engageable therewith, so that said paddle will become vertically affixed to said rotative drive-shaft.

2. A kneading mechanism for making bread, comprising:
   a bucket for receiving bread dough to be kneaded and baked;
   a rotative drive-shaft disposed in said bucket for rotating a kneading paddle in order to knead said bread dough, said rotative drive-shaft having a vertical shaft and a lip portion that is disposed on a top section of said vertical shaft; and
   a kneading paddle having a kneading blade extending from a central, hollow, hub portion, said central, hollow, hub portion having means defining a bore disposed therein for attaching said kneading paddle to said rotative drive-shaft and a top face portion, said bore comprising a hole disposed along a portion thereof, so that when said rotative drive-shaft is initially actuated, said shaft will shift with respect to said hole under a reactive force, thereby causing said lip portion of said shaft to ride over said top face portion of said paddle and become engageable therewith, so that said paddle will become vertically affixed to said rotative drive-shaft.

3. A kneading mechanism for making bread that comprises a kneading paddle that will become automatically, vertically attached to a rotative drive-shaft of said kneading mechanism, under a reactive, rotational force, comprising:
   a bucket for receiving bread dough to be kneaded and baked;
   rotative drive-means disposed in said bucket for rotating a kneading paddle in order to knead said bread dough, said rotative drive-means having a vertical shaft and a lip portion disposed on a top section of said vertical shaft; and
   a kneading paddle having a kneading blade extending from a central, hollow, hub portion, said central, hollow, hub portion having means defining a bore disposed therein for attaching said kneading paddle to said rotative drive-means, said kneading paddle having a top face portion, so that when said rotative drive-means is initially actuated, said shaft will shift with respect to said bore, thereby causing said lip portion of said shaft to ride over said top face portion of said paddle and become engageable therewith, so that said paddle will become vertically affixed to said rotative drive-means.

* * * * *